United States Patent

Gourdon et al.

[11] 3,999,135
[45] Dec. 21, 1976

[54] CLOCK SIGNAL REGENERATION SYSTEM OPERATING ON TERNARY PULSES

[76] Inventors: Claude Gourdon, rue Park-Bras, Perros-Guirec, France, 22700; Jean Thivend, 5 rue Haute Rive, Lannion, France, 22300

[22] Filed: July 1, 1975

[21] Appl. No.: 592,239

[30] Foreign Application Priority Data

July 30, 1974 France ............................. 74.26409

[52] U.S. Cl. ................................. 328/63; 307/261; 307/269; 328/164

[51] Int. Cl.² ..................... H03K 1/17; H03B 1/00; H03K 5/00

[58] Field of Search ..................... 328/63, 162–164; 307/261, 269

[56] References Cited

UNITED STATES PATENTS

| | | | |
|---|---|---|---|
| 3,194,980 | 7/1965 | Scattaglia | 328/164 |
| 3,207,925 | 9/1965 | Berger | 307/261 |
| 3,249,763 | 5/1966 | Hopner | 307/261 |
| 3,390,283 | 6/1968 | Hannigsberg | 328/164 |
| 3,518,456 | 6/1970 | Mauduit et al. | 307/269 |
| 3,544,912 | 12/1970 | Zegers et al. | 328/164 |

*Primary Examiner*—Stanley D. Miller, Jr.

[57] ABSTRACT

Apparatus for regenerating periodic clock signals in a ternary pulse transmission system. It comprises an input transformer with a secondary winding having a grounded midpoint, a high "Q" band-pass filter tuned to the repetition frequency of the clock signals, and a shaping circuit for these clock signals. The apparatus further comprises a threshold level comparator differentially supplied by the input transformer and supplying through an addition circuit an adjustable delay line whose output is connected through the filter to the said shaping circuit. The latter circuit may comprise a limiting amplifier combined with a pair of flip-flop circuits.

4 Claims, 5 Drawing Figures

CLOCK SIGNAL REGENERATION SYSTEM OPERATING ON TERNARY PULSES

The invention relates to the field of telecommunications by cable and more particularly to the multiplex transmission of coded pulses.

In this type of transmission, the connections comprise repeater-regenerators periodically distributed along the cable. These have to regenerate the clock signals corresponding to the series of pulses they receive, in order to deliver a message identical with that which has been emitted.

It is known for instance, as a result of the French Patent No. 1,245,299, filed by the WESTERN ELECTRIC Company on Sept. 26, 1960, to regenerate clock signals by means of an analog apparatus comprising a full-wave rectifier followed by a narrow-band amplifier according to the diagram shown in box 1 of FIG. 1 of the drawing annexed to the present application.

The object of the present invention is an apparatus for regenerating clock signals and in particular their phase. The apparatus for regenerating clock signals comprises: an input transformer with a secondary winding having a grounded midpoint, and a filter having a high quality factor whose output is connected to a circuit shaping the said clock signals. The apparatus according to the invention further comprises two identical threshold comparators, each one of which has a first input connected to a terminal of the secondary winding of the said transformer, and a second input kept at a voltage equal to the threshold value, each of their outputs being connected to one of the two inputs of an "OR" circuit, whose output is itself connected to the input of the said filter.

The apparatus for regenerating clock signals according to the invention presents the following advantages:

Transformation of the analog signals arriving from the input transformer into numerical signals is effected directly by making use of the two comparators already provided in the apparatus to recognize the presence and polarity of the input pulses. The fact that they are located at the input of the apparatus not only avoids introducing new components, but allows the number of components to be reduced by eliminating two diodes.

Since the information signals and the clock signals pass through the comparators, variations in the time of their transmission do not entail variation in the relative phase of the information signals with respect to the clock signals.

Other characteristics and advantages of the apparatus for regenerating clock signals according to the invention will appear in the course of the description, illustrated with FIGS. 2 to 5, which are given by way of non-limitative example, and wherein.

Figure 1:
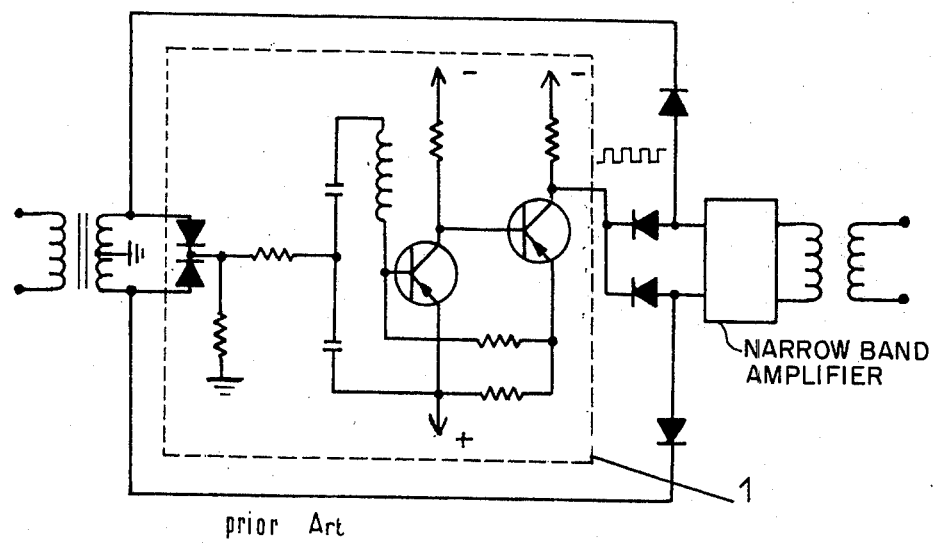
FIG. 1 shows apparatus of the prior art, as already mentioned.
Figure 2:
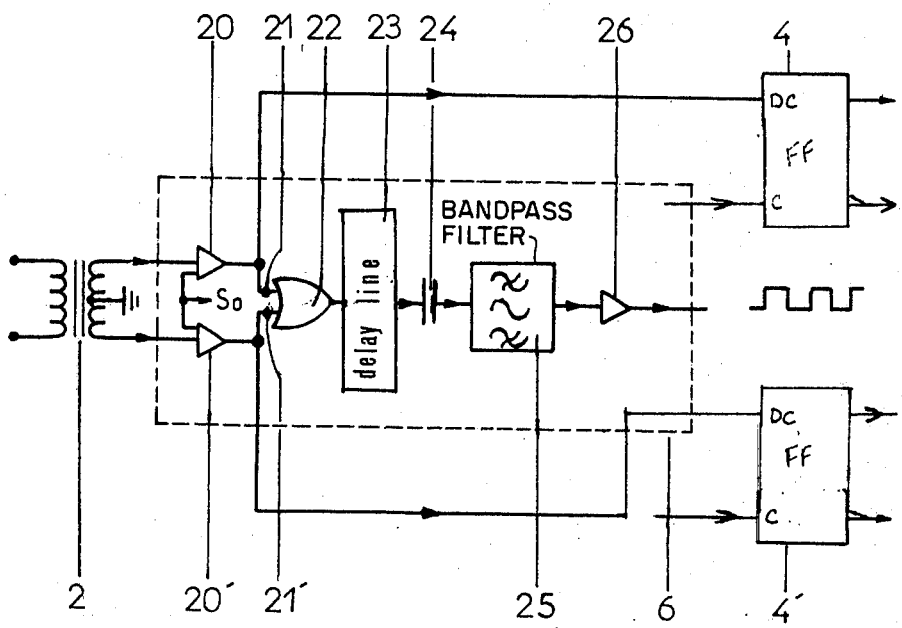
FIG. 2 is the operational diagram of the apparatus according to the invention and the main elements of the regenerator with which it co-operates.
Figure 5:
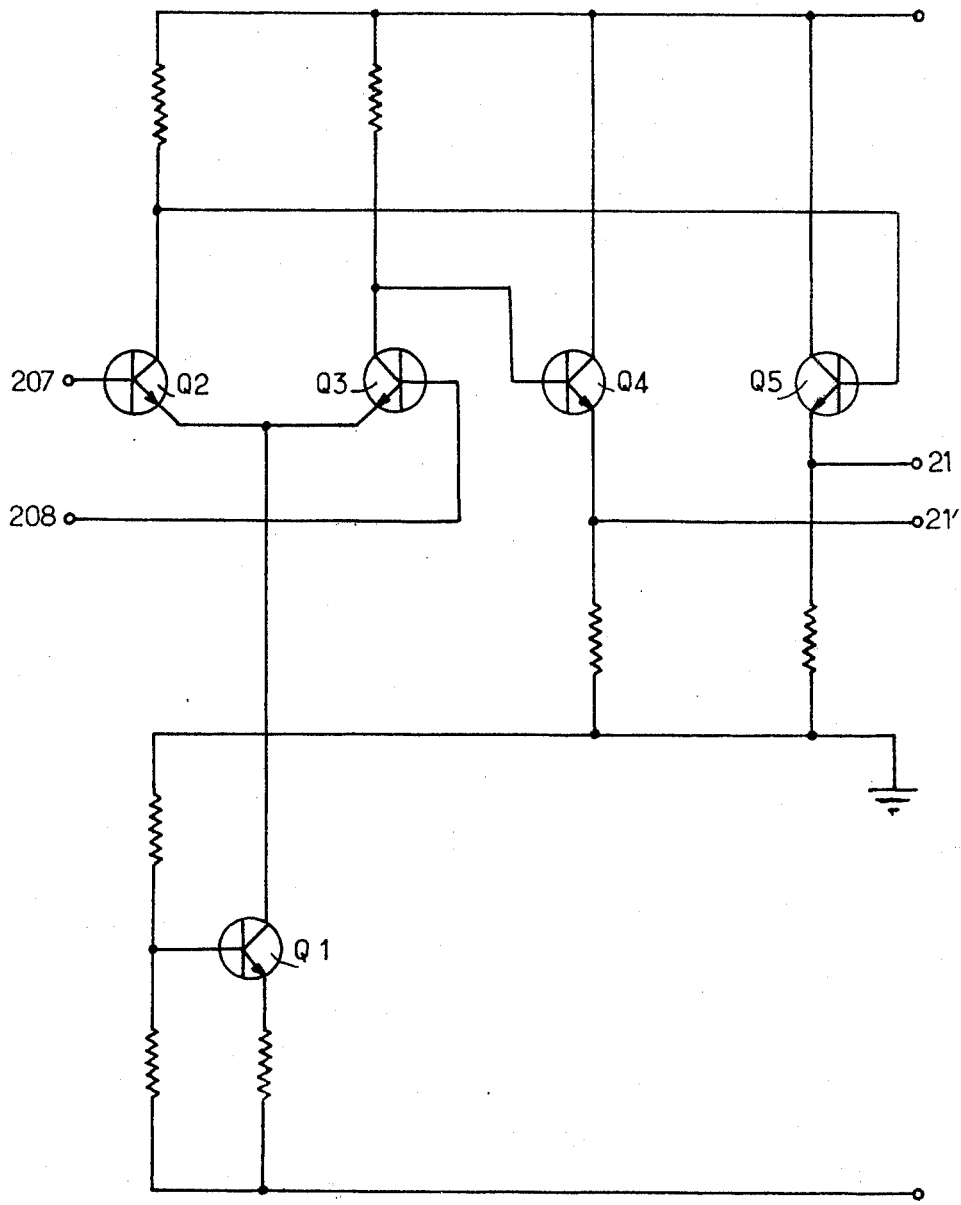
FIG. 5 shows a variant of the comparator circuit 20—20' of FIG. 2.

FIG. 2 shows within the box 6 apparatus for regenerating clock signals, and outside this box some of the elements of the pulse regenerator in which it is incorporated. Of these 2 denotes the input transformer, while 4 and 4' indicate two pulse regeneration circuits actuated by clock signals. Within the box 6, two identical threshold comparators 20 and 20' have each one of their inputs connected to one of the terminals of the secondary winding of the transformer 2 and another input $S_0$ connected to a steady source of reference voltage. The outputs of each of the comparators 20 and 20' are respectively connected to the inputs of the two type D flip-flop circuits 4 and 4', on the one hand, and to the two inputs of an OR circuit 22, on the other hand. The outputs of the OR circuit 22 is connected to the input of a delay line 23. The output of the latter is connected through a capacitor 24 to the input of a filter 25. The output of the filter 25 is connected to the input of a circuit shaping the clock signals, which consists of a two-stage amplifier 26. The first of these two stages has a linear amplification curve, whereas the second is a clipper delivering signals in the form of square pulses which constitute the clock signals. In a modification of the invention the amplifier 26 is built in a manner analogous to that of the comparator circuits 20—20' whose a form of embodiment is shown in FIG. 5.

Figure 3:
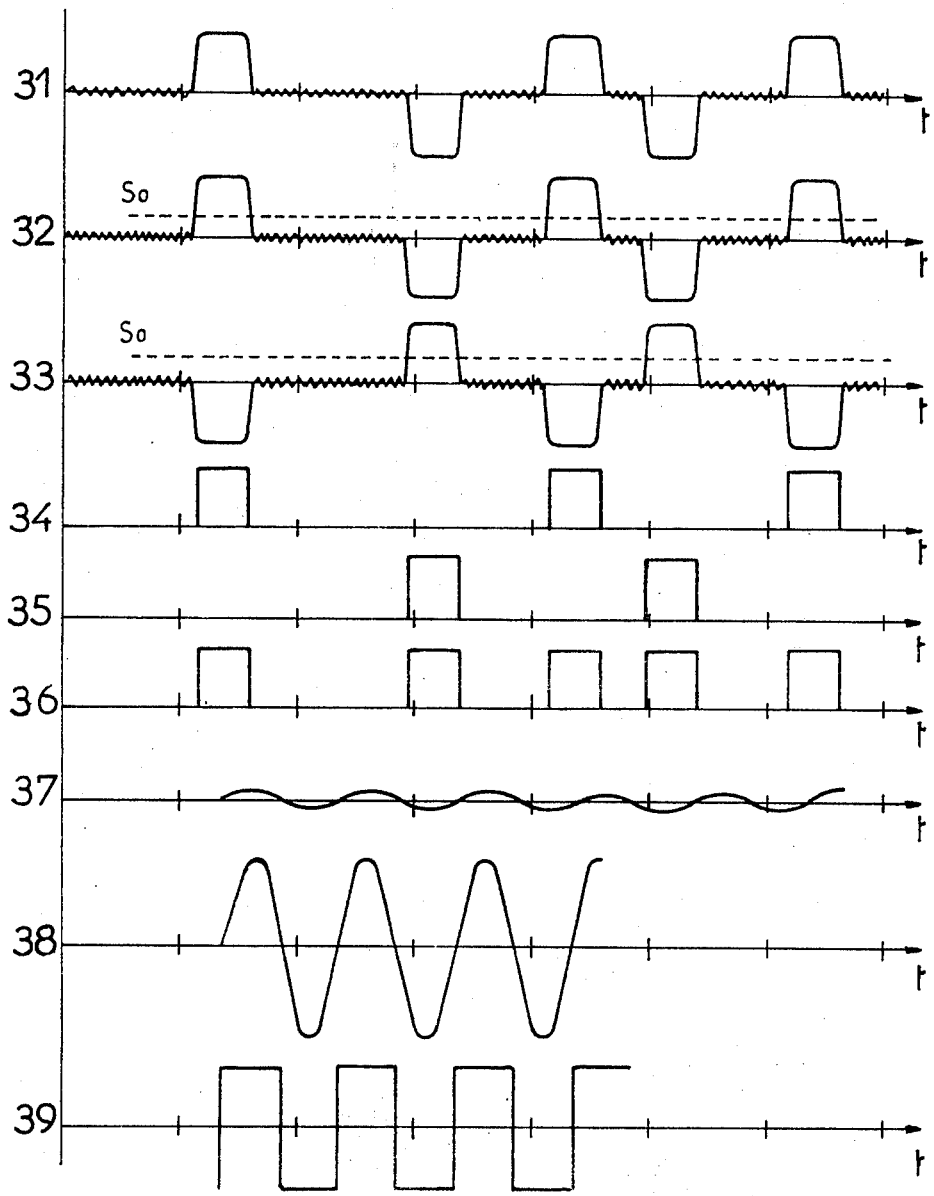
FIG. 3 shows the waveforms of the signals delivered by the main elements of the apparatus for regenerating clock signals according to the invention.

The functioning of the apparatus for regenerating clock signals from ternary pulses may be explained as follows by means of the graphs in FIG. 3. When a series of pulses, such as are represented on line 31 of FIG. 3, arrives at the primary winding of the transformer 2, there will arise between the midpoint and each terminal of the secondary winding two voltages of opposite polarity, represented by the graphs 32 and 33. The comparator 20, whose threshold value $S_0$ is considerably above the noise level, delivers a positive pulse, shown on the curve 34, to the input 21 of the OR circuit 22 in correspondence to each positive pulse represented on the curve 32. In the same way, the comparator 20', whose threshold value is equal to $S_0$, delivers to the input 21' of the OR circuit 22 a positive pulse represented on the curve 35 which corresponds to each positive pulse of the curve 33. The graph 36 shows the sequence of pulses delivered by the OR gate 22. These are delayed in 23, then the D.C. component is eliminated by the capacitor 24. As is well known, although a certain number of pulses may be missing and despite the presence of weak, random phase distortions of those that persist with respect to the clock signal, the phase of the latter can be restored by a high Q filter provided that its characteristic frequency is equal to the clock frequency. The high Q of the filter ensures the phase constancy of the sinusoidal wave which it delivers during the series of missing pulses. It thus enables it, owing to the low energy subtracted from each input pulse, to regenerate the phase of the clock signals by eliminating accidental deviations whose mean value, taken over a large number of pulses, is nil. The curve 37 represents the sinusoidal signal delivered by the filter. The phase and amplitude of the signal do not depend on the possible occurrence of consecutive zeros, whose number may be of the order of ten. The curve 38 represents the signal delivered by the first stage of the amplifier 26, and the curve 39 represents the clock signal delivered by the second stage of the same amplifier.

Figure 4:
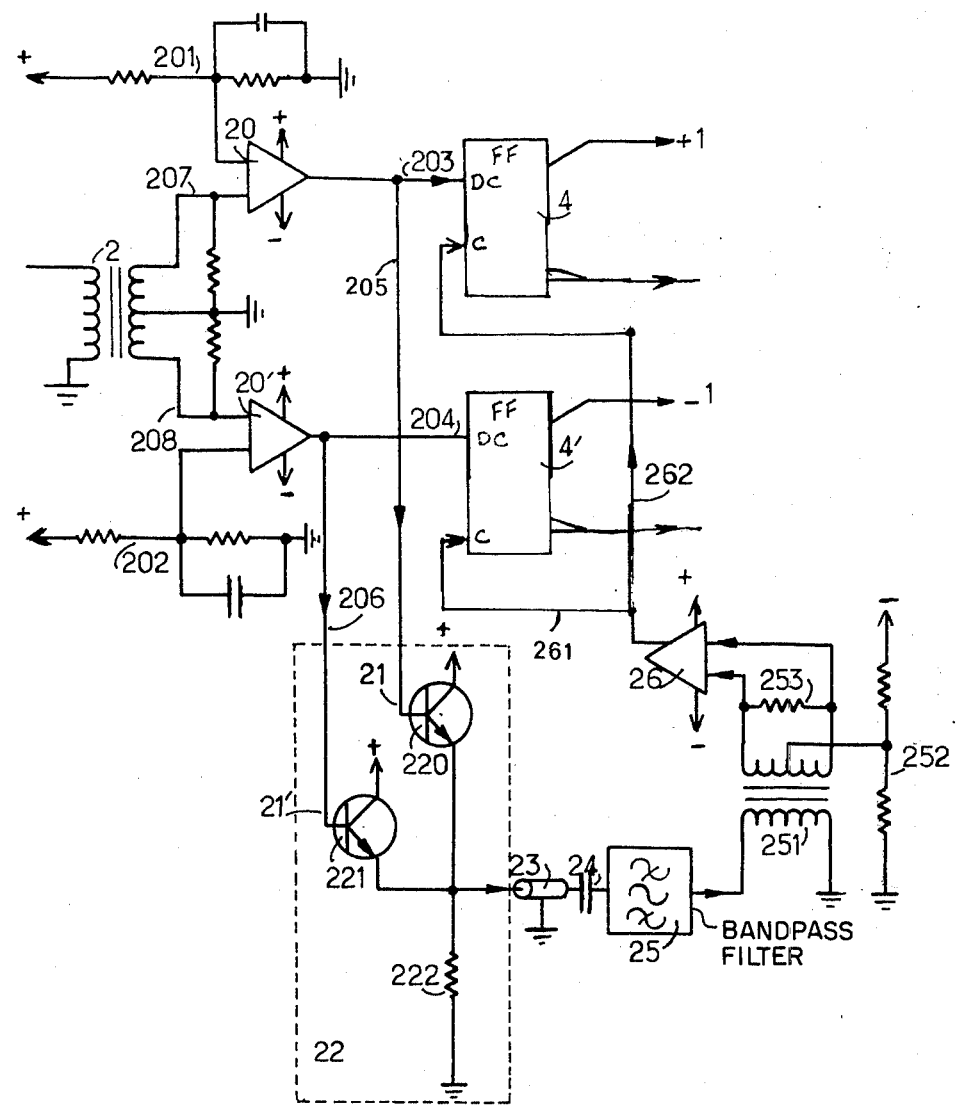
FIG. 4 shows the circuitry of the apparatus according to the invention operating at a modulation frequency exceeding 100 MHz.

FIG. 4 shows the circuitry of an embodiment of the apparatus for regenerating clock signals according to the invention, given by way of non-limitative illustration. The reference numbers denoting elements that have already been described in connection with other figures have been preserved. As in FIG. 2, the terminals of the secondary winding of the transformer 2 are connected each to one of the inputs of the threshold comparators 20 and 20', and the midpoint of the secondary is grounded. The comparators 20 and 20', a possible embodiment of which forms the subject of FIG. 5, have their second input kept at a voltage equal to the threshold voltage $S_0$ of the comparator by the resistance bridges 201 and 202 respectively. The outputs of these comparators are respectively connected by the leads 203 and 204 to the inputs of flip-flops of the D type, indicated by the references 4 and 4'. These flip-flops may be, for instance, of the type ECL 1670, marketed among others by the Motorola Company. The comparators 20 and 20' are also connected by the leads 205 and 206 to the inputs 21 and 21' of the OR circuit 22. The latter comprises two transistors 220 and 221, connected by their emitters to the same terminal of a resistor 222, whose other terminal is grounded. One terminal of the inner conductor of a short length of coaxial cable 23 is connected to the resistor 222, while its other terminal is connected to one of the electrodes of a capacitor 24. The length of the coaxial cable, which plays the part of a delay line, is so adjusted as to place the rising slope of the clock pulses 39 (FIG. 3) actuating the flip-flops 4 and 4' at the moments when the information coming from the comparators 20 and 20' is correct, in other words to place the rising slopes of the pulses 39 at the middle of the pulses 36 (FIG. 3). The other electrode of the capacitor 24 is connected to the input of a band-pass filter 25, whose output is connected in its turn by a transformer 251 of low voltage raising ratio to the two inputs of a differential amplifier 26 shaping the clock pulses. A resistor 253, placed in parallel with the secondary winding of the transformer 251, reflects into the primary an impedance to form the load of the filter 25. To obtain the latter a piezoelectric quartz filter has been used with success following the mounting of Jaumann. A description of this mounting has been published on pages 23 and 62 of the work "Les filtres à cristaux piézoélectriques" by D. Indjoudjian and P. Andrieux, published by Gauthier-Villars, Paris, France, 1953. In any event this type of filter is not a restrictive feature. The midpoint of the secondary winding of the transformer 251 is brought to a negative potential by a resistance bridge 252. The output of the shaping circuit 26 is connected to the two inputs controlling the flip-flops 4 and 4' by the leads 261 and 262.

The circuitry described above ensures the regeneration of clock pulses with a modulation rhythm of 105 MHz. It allows to regenerate ternary signals containing zero sequences that may reach 50 substantially without any marked change in the ouput level.

FIG. 5 shows an embodiment of the double comparator circuit 20—20' of FIG. 2. As will be seen, this circuit contains essentially two pairs of transistors $Q_2-Q_3$ and $Q_4-Q_5$. The transistors of the first pair are differentially supplied by the two terminals 207 and 208 of the transformer 2 shown in FIG. 2. The $Q_4-Q_5$ pair of transistors ensures the amplification of the signals delivered by $Q_2-Q_3$ and the matching of the impedance to a value needed to decouple the transistors $Q_2-Q_3$ in relation to the load constituted by the OR circuit 22 (FIG. 2), whose only two inputs 21 and 21' are shown in FIG. 5. The transistor stage $Q_1$ forms a generator of current supplying the threshold circuit $Q_2-Q_3$. The transistors $Q_1$ to $Q_5$ may be of the type manufactured by the French Company "Lignes Télégraphiques et Téléphoniques" under No. 77 16G 009. Alternately, the transistors $Q_2$ and $Q_3$ may be of the type manufactured by the same Company under No. 77 15G 006. Other manufacturers market transistors of comparable performance, for instance the series HP 22 of Hewlett-Packard Co. and the series CG 123 of the French Company "Compagnie Générale d'Electricité", which, however, are less suitable than the former for the circuitry according to the invention.

What we claim is:

1. An apparatus for regenerating periodic clock signals in a ternary pulse transmission system, comprising:
    an input transformer having a primary winding to which analog pulse signals are applied;
    said input transformer having a secondary winding provided with two output terminals and a ground at the midpoint of said secondary winding;
    said secondary winding providing between said midpoint and each of said output terminals respective voltages of opposite polarities;
    a first shaping circuit comprising two threshold level comparators, each comparator having two inputs, one of the two inputs of each comparator being connected to a reference voltage and the other of the two inputs being connected to said secondary winding terminals;
    an adjustable delay line;
    said threshold level comparator having two outputs feeding through an addition circuit to the adjustable delay line;
    said threshold level comparator being connected to the two inputs of said addition circuit and having its two outputs delivering square shape voltages;
    said addition circuit having its output connected to the input of a high-Q band-pass frequency filter through said adjustable delay line;
    a second shaping circuit connected to the ouput of said high-Q band-pass frequency filter and delivering the regenerated periodic clock signals; and,
    said high-Q band-pass frequency filter being tuned for the repetition frequency of said periodic clock signals.

2. An apparatus according to claim 1 wherein the said delay line is a segment of coaxial line of adjustable length.

3. An apparatus according to claim 1 wherein the said addition circuit is an OR circuit.

4. An apparatus according to claim 1 wherein the said filter circuit comprises a piezoelectric quartz filter.

* * * * *

UNITED STATES PATENT OFFICE
CERTIFICATE OF CORRECTION

PATENT NO. : 3,999,135
DATED : December 21, 1976
INVENTOR(S) : CLAUDE GOURDON and JEAN THIVEND It is certified that error appears in the above-identified patent and that said Letters Patent are hereby corrected as shown below:

After "Inventor" insert: -- Assignee:

LIGNES TELEGRAPHIQUES ET TELEPHONIQUES, Paris, France

Signed and Sealed this

Twenty-ninth Day of March 1977

[SEAL]

Attest:

RUTH C. MASON
*Attesting Officer*

C. MARSHALL DANN
*Commissioner of Patents and Trademarks*